United States Patent [19]

Furuhashi et al.

[11] Patent Number: 4,797,801
[45] Date of Patent: Jan. 10, 1989

[54] PLURAL POLYPHASE INVERTER UNITS HAVING TONED INPUT FILTERS

[75] Inventors: Takeshi Furuhashi, Tokyo; Yoshio Kamei, Yoshikawa, both of Japan

[73] Assignee: Kabushiki Kaisha Toshiba, Kawasaki, Japan

[21] Appl. No.: 162,904

[22] Filed: Mar. 2, 1988

[30] Foreign Application Priority Data

Mar. 3, 1987 [JP] Japan .................................. 62-46886

[51] Int. Cl.⁴ ........................................... H02M 1/14
[52] U.S. Cl. ......................................... 363/43; 363/58; 363/72
[58] Field of Search .................................. 363/40–43, 363/58, 72

[56] References Cited

U.S. PATENT DOCUMENTS 4,063,143 12/1977 Forstbauer ........................... 363/41

Primary Examiner—William H. Beha, Jr.
Attorney, Agent, or Firm—Foley & Lardner, Schwartz, Jeffery, Schwaab, Mack, Blumenthal & Evans

[57] ABSTRACT

A polyphase inverter includes a plurality of unit inverters connected to a single power source to form an a.c. output with the unit inverters being polyphase, thus to take out the resultant output. In this polyphase inverter, a series circuit including a capacitor and a fuse, and a reactor for protection coordination of the fuse are connected between the d.c. power source and each unit inverter. The resonance frequency of a resonance circuit constituted by the capacitor and the reactor is selected so that it is substantially equal to the product of the number of unit inverters, the number of pulses of the unit inverter, and the output fundamental frequency.

3 Claims, 4 Drawing Sheets

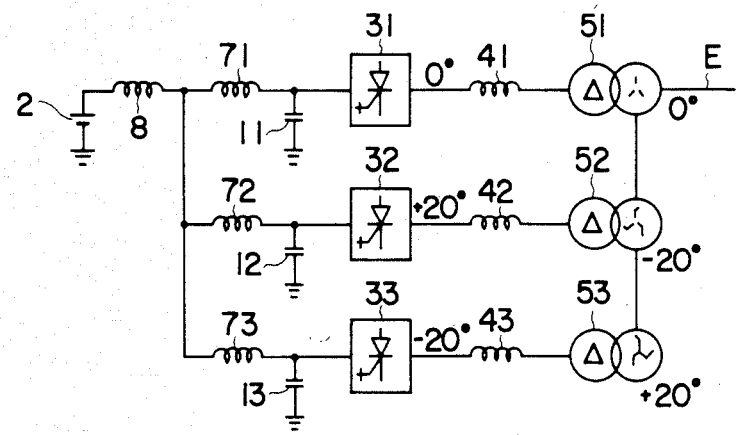
F I G. 1
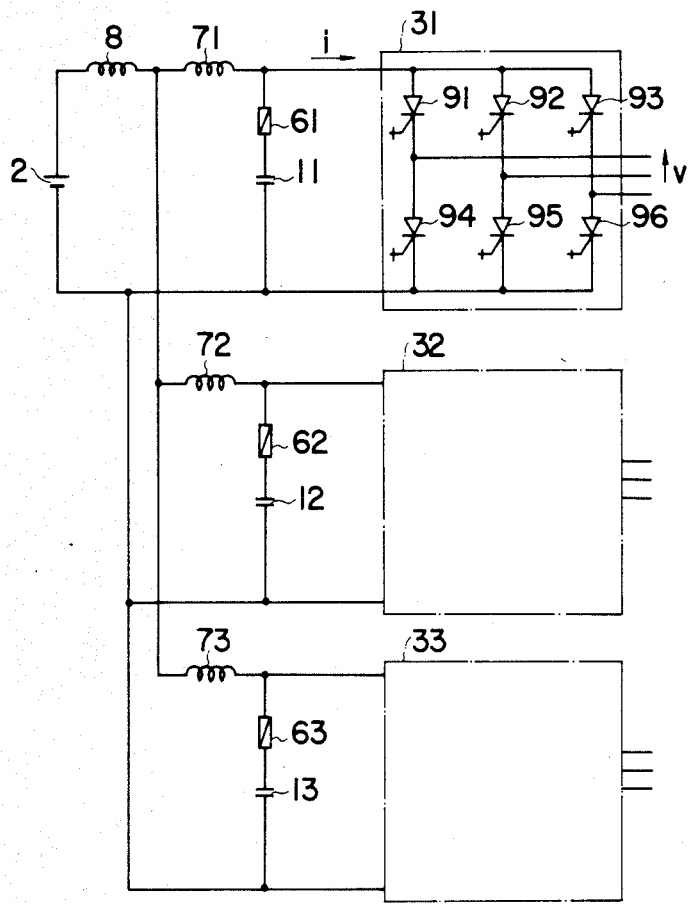
F I G. 2

PLURAL POLYPHASE INVERTER UNITS HAVING TONED INPUT FILTERS

BACKGROUND OF THE INVENTION

1. Field of the Art

This invention relates to an inverter of the polyphase configuration including a plurality of unit inverters connected in parallel with a common d.c. power source.

2. Prior Art

For the system to obtain an alternating current from a d.c. power source, there is known a system to connect a plurality of inverters serving as unit inverters in parallel with a single d.c. power source to operate these inverters as they being out of phase with each other to synthesize their respective outputs, thus to provide a sine wave a.c. output. Such a system can reduce harmonics to much extent by synthesis of outputs of the plurality of inverters as compared to the system of individually operating inverters. Since many harmonics are included in the input current of the unit inverters, a filter circuit using a capacitor is inserted in the input. A fuse for cutting a current off at the time of short circuit of the capacitor is inserted in series with the capacitor. In addition, a reactor for protection coordination of the fuse is provided. Since the capacitor and the reactor exist as just described above, a resonance circuit is constituted.

If the resonance frequency of the resonance circuit is in correspondence with any frequency of harmonics included in the input current, an overcurrent is to flow in the resonance circuit. Thus, it is required to increase the rated capacity of the reactor or the capacitor, etc. by taking such an overcurrent into consideration. As a result, the filter circuit component becomes large in dimension accordingly and also becomes costly.

SUMMARY OF THE INVENTION

An object of this invention is to reduce the rated capacity of the filter circuit components in the polyphase inverter.

To achieve this object, analysis of currents at respective circuit portions or sections of the polyphase inverter has been conducted, whereby it has been found that effective measures can be taken by suitably selecting the resonance frequency of the filter circuit components, thus to constitute a circuit adapted therefor on the basis of the above recognition.

BRIEF DESCRIPTION OF THE DRAWINGS

FIG. 1 is a diagrammatical view showing the system construction of a polyphase inverter to which this invention is applied;

FIG. 2 is a circuit diagram showing the detail of the inverter in FIG. 1;

DETAILED DESCRIPTION OF THE INVENTION

Figure 3:
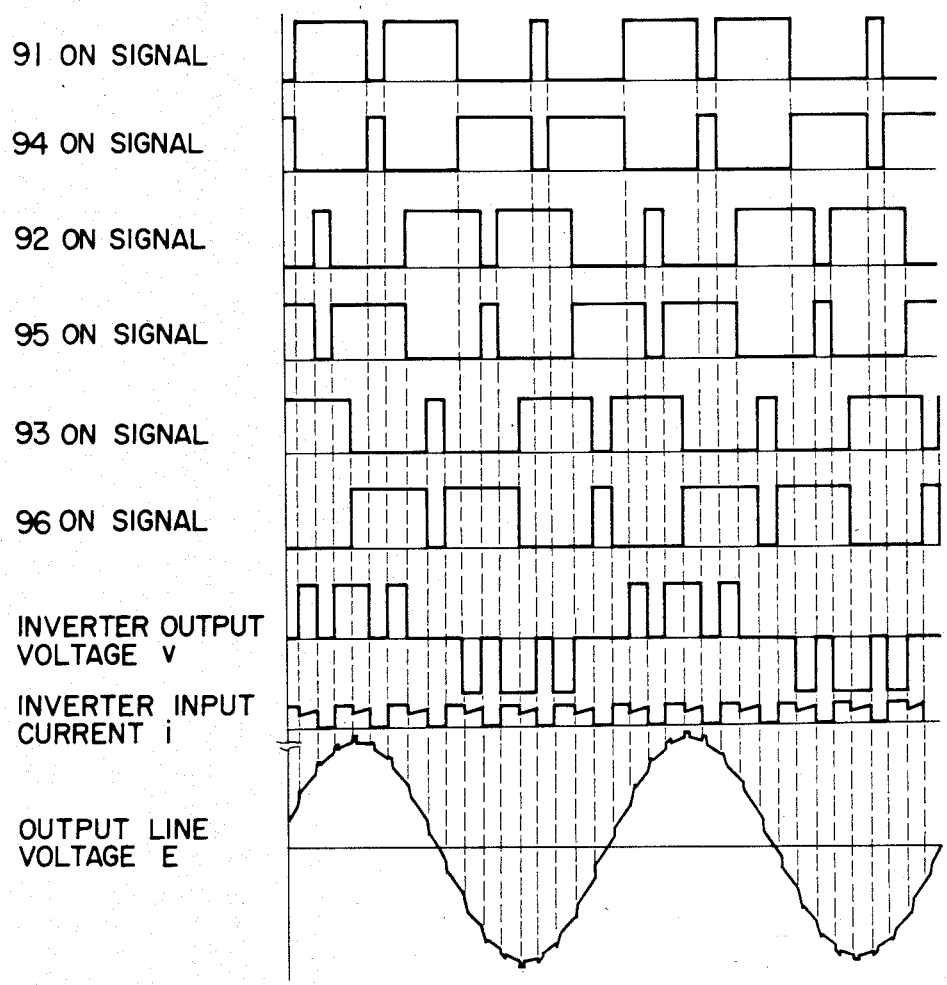
FIG. 3 is a timing chart showing the operation of the switching elements, and the output voltage of the inverter, etc. in the circuit in FIG. 2.

FIG. 1 shows a configuration of a polyphase inverter to which this invention is applied.

This inverter has an arrangement such that three inverter systems are connected in parallel with a d.c. power source 2 through a cable 8 having an inductive component to synthesize their outputs, thus to provide a sine wave output E. These inverter systems are provided with reactors 71, 72 and 73, capacitors 11, 12 and 13, inverters 31, 32 and 33, interconnection or linking reactors 41, 42 and 43 are transformers 51, 52 and 53, respectively. According to circumstances, leakage reactances of the transformers 51, 52 and 53 replace the reactors 41, 42 and 43. The switching elements respectively incorporated therein are subjected to pulse width modulation (PWM) control, thereby producing a.c. outputs.

The number of pulses of the inverter is determined by the relationship expressed below:

(Number of inverters)×(Number of pulses per each inverter).

In the example shown in FIG. 1, the number of inverters is equal to 3 and the number of pulses per each inverter is equal to 6. Thus, the number of pulses of the polyphase inverter is equal to 18 because 3 multiplied by 6 is 18.

To constitute an n-pulse inverter using a plurality of inverters, it is sufficient to allow the output voltages of respective inverters to be 360 degrees/n out of phase with each other, thus to synthesize them. In the example shown in FIG. 1, the output voltage phases of the inverters 31 to 33 are shifted by 360 degrees/18=20 degrees in succession. The outputs of three inverters 31 to 33 obtained are synthesized by transformers 51 to 53. In this case, as well known, zigzag-star connection is implemented to these transformers 51 to 53 in order to compensate phase shift or deviation by the inverters 31 to 33. Namely, the transformer 52 shifts a phase of −20 degrees in order to compensate phase shift of +20 degrees by the inverter 32. In addition, the transformer 53 shifts a phase of +20 degrees in order to compensate phase shift of −20 degrees by the inverter 33.

FIG. 2 shows the detail of the configuration of the d.c. power source 2, the cable 8, the reactors 71 to 73, the capacitors 11 to 13, and the inverters 31 to 33 in FIG. 1. The cable 8 is inserted commonly into the three inverter systems. Into the inverter systems, reactors 71, 72 and 73 are serially inserted, respectively. Further, series circuits comprising fuse 61 and capacitor 11, fuse 62 and capacitor 12, and fuse 63 and capacitor 13 are inserted into the d.c. input terminals of the inverters, respectively. It is to be noted that the reactors 71, 72 and 73 are inserted for protection coordination of the fuses 61, 62 and 63, respectively.

In addition, switching elements are assembled into the respective inverters. As a representative example, switching elements 91 to 96 are assembled into the inverter 31 as shown in FIG. 2.

FIG. 3 is a waveform diagram for explanation of respective operations of the inverter thus constituted. As an example, the waveforms in one of unit inverters constituting the polyphase inverter are shown wherein only a voltage E across output lines is related to the polyphase inverter. In this figure, there are shown on-off waveforms of respective switching elements and waveforms of the output voltage E and the input current i. Although not shown, there are further two sets of waveforms similar to those shown, which are 20 degrees out of phase in succession.

The outputs that respective unit inverters 31 to 33 form in accordance with the switching operations of the switching elements 91 to 96 have waveforms of a sinusoidal wave approximated by the combination of retangular waves. Accordingly, many harmonics are included therein. By synthesizing outputs of the plurality of unit inverters including many harmonics, a waveform approximate to sine wave is obtained as a resultant output E.

In the input current of the inverter, harmonics expressed below are included:

(Fundamental frequency of output voltage)×(Number of pulses per each inverter)×n.

When this is considered in connection with the example of unit inverters in the polyphase inverter in FIG. 2, harmonics expressed as:

6n×(Fundamental frequency of output voltage), i.e., the 6n-th order harmonic of (fundamental frequency of output voltage) are included.

The input current waveform including these harmonics is to become distorted as shown in FIG. 3.

If resonance occurs at a resonance frequency fr, which is expressed below, based on the inductance L of the reactor and the capacitance C of the capacitor in the filter circuit with respect to the input current including such harmonics, an overcurrent flows:

$$fr = 1/\{2n \sqrt{(LC)}\}.$$

To prevent this, in the prior art, the resonance frequency is shifted to that it is not equal to the frequency of the harmonic. In general, the resonance frequency of the filter circuit is adjusted to a frequency lower than the minimum order harmonic of harmonics included in the input current. From a theoretical point of view, it is sufficient to shift the resonance frequency on the side of higher order than the minimum order harmonic, but such a method is not actually employed because the requirement of the manufacturing precision of the reactor and capacitor, particularly capacitor becomes rigorous, resulting in difficulty in manufacture.

This is because a large reactor or capacitor had to be used in the prior art apparatus.

EMBODIMENT

FIGS. 4 to 8 show an embodiment of this invention which is made for the countermeasure of the above-mentioned problem. This embodiment is characterized in that the resonance frequency of the filter circuit is suitably selected, thereby to prevent an overcurrent from flowing.

Such an implementation is based on the fact that it has been found that there exits a phenomenon such that harmonic components included in the input current cancel with each other between respective inverters as a result of the analysis of the operation of the circuit in the polyphase inverter using a plurality of inverters.

By the harmonic cancellation phenomenon between inverters, it is sufficient for a filter circuit to take measures for higher order harmonics. As a result, even if a smaller reactor or capacitor is employed, it is expected that a sufficient filter effect can be performed.

The embodiment shown in FIGS. 4 to 8 will be now described n more detail.

Figure 4:
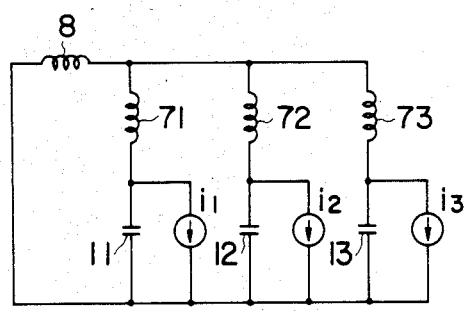
FIG. 4 is an equivalent circuit diagram of an embodiment according to this invention.

FIG. 4 shows the equivalent circuit of the polyphase inverter circuit in FIG. 2 wherein respective unit inverters are symbollically designated by input currents $i_1$, $i_2$ and $i_3$. Accordingly, the polyphase inverter circuit is composed of these input currents $i_1$, $i_2$ and $i_3$, reactors 71, 72 and 73, and capacitors 11, 12 and 13, and common reactor 8.

Figure 5:
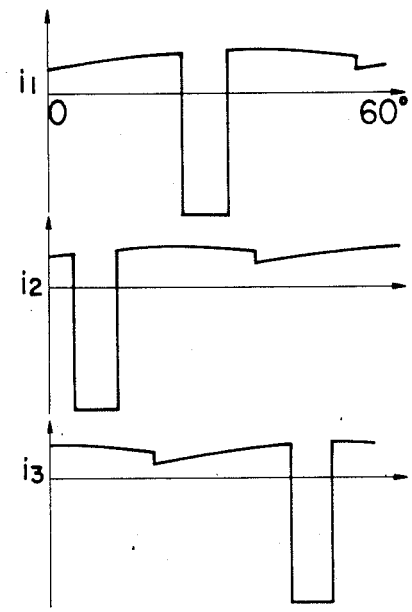
FIG. 5 is a diagram showing current waveforms in the equivalent circuit in FIG. 4.

FIG. 5 shows waveforms of input currents $i_1$, $i_2$ and $i_3$ flowing in the equivalent circuit in FIG. 4, which are obtained by eliminating d.c. components from the input current waveform i in FIG. 3.

Figure 6:
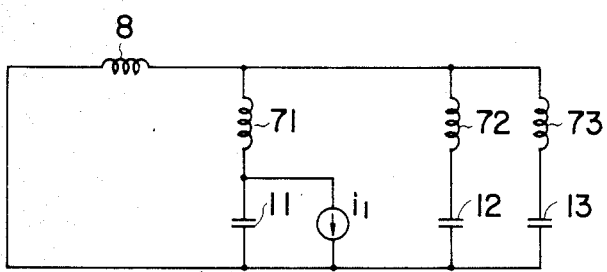
FIGS. 6, 7A, 7B and 7C are analytical equivalent circuit diagrams for showing the operation of the equivalent circuit in FIG. 4 in more detail.

FIG. 6 shows an equivalent circuit obtained by paying an attention particularly to the input current $i_1$ in the equivalent circuit in FIG. 5 to rewrite it in regard to the 18-th order harmonic wherein an indication of the input currents $i_2$ and $i_3$ is omitted.

Figure 7A:
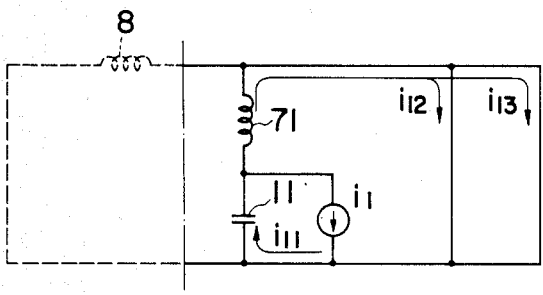

FIG. 7A shows an equivalent circuit obtained by further simplifying the equivalent circuit in FIG. 6 wherein since it is assumed that two resonance circuits comprising reactor 72 and capacitor 12, and reactor 73 and capacitor 13 are short-circuited for the 18-th order harmonic, an indication thereof is omitted and an indication of the reactor 8 is omitted because it is not necessary for explanation of the circuit.

Figure 7B:
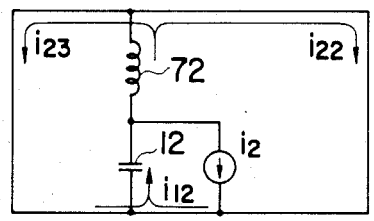
Figure 7C:
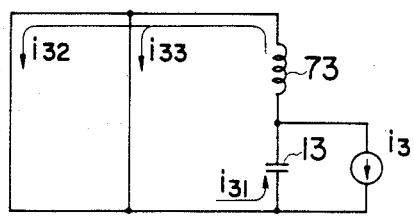

FIGS. 7B and 7C show equivalent circuits obtained by paying an attention to the input currents $i_2$ and $i_3$, respectively.

Figure 8:
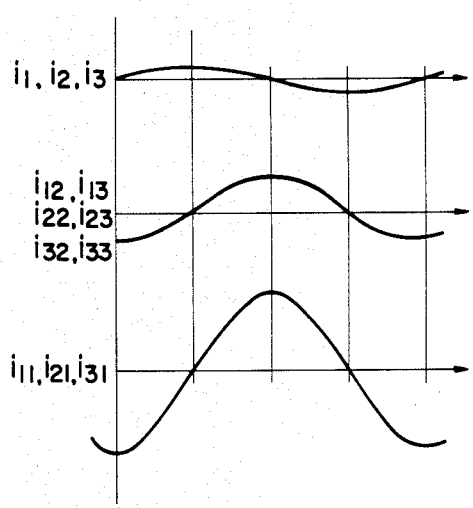
FIG. 8 is a diagram showing current waveforms at respective portions in the analytical equivalent circuit diagrams in FIGS. 7A to 7C.

FIG. 8 shows the magnitudes and the phases of the respective 18-th order harmonic current in FIGS. 7A to 7C.

These currents have the following relationship. Namely, the input currents $i_1$, $i_2$ and $i_3$ (in phase with each other), respective branch currents $i_{12}$, $i_{13}$, $i_{22}$, $i_{23}$, $i_{32}$ and $i_{33}$ (in phase with each other), and respective capacitor currents $i_{11}$, $i_{22}$ and $i_{23}$ (in phase with each other) have the following relationship:

$$i_1, i_2, i_3 < i_{12}, i_{13}, i_{22}, i_{23}, i_{32}, i_{33} = i_{11}/2, i_{21}/2, i_{31}/2.$$

Since the respective branch currents $i_{12}$, $i_{13}$, $i_{22}$, $i_{23}$, $i_{32}$ and $i_{33}$, and the respective capacitor currents $i_{11}$, $i_{21}$ and $i_{32}$ are resonance currents, they are considerably larger than the input current.

When these currents are superposed, currents which are 180 degrees out of phase have the following relationship:

$$i_{12} + i_{13} - i_{23} - i_{32} \doteq 0, \text{ and } i_{11} - i_{23} - i_{32} \doteq 0.$$

Thus, they cancel with each other.

It is to be noted that lower order harmonics next to the minimum order harmonic, e.g., in the case of the above-mentioned example, the 6-th and the 12-th harmonics for the 18-th higher harmonic do not flow from the side of the inverter into the side of the d.c. power source since the polyphase inverter is constituted with the plurality of unit inverters, resulting in no influence on the d.c. power source.

What is claimed is:

1. A polyphase inverter comprising:
a plurality of unit inverters;
a plurality of filter capacitors provided at respective d.c. input sections of said unit inverters;
a plurality of fuses inserted in series with said filter capacitors, respectively;
a filter circuit including a plurality of reactors inserted into d.c. side circuits of said unit inverters for protection coordination of said fuses, and having a resonance frequency selected so that it is equal to a frequency obtained by the product of the number of pulses per each of said unit inverters, the number of said unit inverters, and the output fundamental frequency;
reactors in the respective output paths of said unit inverters; and
a plurality of transformers for synthesizing outputs of said plurality of unit inverters, thus to provide a single output.

2. A polyphase inverter as set forth in claim 1, wherein said unit inverters are six-pulse, three-phase output type, three unit inverters constituting said polyphase inverter, the operating phases of said respective unit inverters being shifted by 20 degrees in succession with respect to the output fundamental wave.

3. A polyphase inverter as set forth in claim 1, wherein said reactors are composed of leakage reactances of said transformers.

* * * * *